United States Patent
Margerie

(10) Patent No.: US 7,476,156 B2
(45) Date of Patent: Jan. 13, 2009

(54) HOMOKINETIC JOINT

(75) Inventor: Michel Margerie, Vetheuil (FR)

(73) Assignee: GKN Driveline International GmbH, Lohmar (DE)

( * ) Notice: Subject to any disclaimer, the term of this patent is extended or adjusted under 35 U.S.C. 154(b) by 335 days.

(21) Appl. No.: 11/122,585

(22) Filed: May 5, 2005

(65) Prior Publication Data

US 2005/0249544 A1 Nov. 10, 2005

(30) Foreign Application Priority Data

May 10, 2004 (FR) .................................. 04 05034

(51) Int. Cl.
*F16D 3/205* (2006.01)

(52) U.S. Cl. ....................... 464/111; 464/905

(58) Field of Classification Search ................. 464/111, 464/132, 905

See application file for complete search history.

(56) References Cited

U.S. PATENT DOCUMENTS

| | | | |
|---|---|---|---|
| 2,860,869 A | 11/1958 | Utvitch | |
| 4,923,326 A | 5/1990 | Fietzke | |
| 5,376,049 A * | 12/1994 | Welschof et al. | 464/111 |
| 5,507,693 A | 4/1996 | Schwarzler et al. | |
| 5,591,085 A | 1/1997 | Stall et al. | |
| 6,298,556 B1 * | 10/2001 | Stall et al. | 464/111 X |
| 6,416,231 B1 | 7/2002 | Verbrugge et al. | |
| 6,478,682 B1 | 11/2002 | Kura et al. | |

FOREIGN PATENT DOCUMENTS

| | | |
|---|---|---|
| DE | 2 443 366 | 4/1976 |
| DE | 4 007 941 | 9/1990 |
| EP | 1 413 787 A2 | 4/2004 |
| FR | 697 162 | 1/1931 |
| FR | 2 738 881 | 3/1997 |
| JP | 09 133 145 | 5/1997 |

* cited by examiner

*Primary Examiner*—Greg Binda
(74) *Attorney, Agent, or Firm*—Rader, Fishman & Grauer, PLLC

(57) ABSTRACT

This homokinetic joint includes a roller assembly (9) having an inner ring (10) with a ring end surface (16) which is directed in a direction (S1), an outer roller (11) having a roller end surface (32) which is directed in the direction (S1), a needle ring (12), and a mechanism (13) for axially retaining the needle ring (12) on the inner ring (10). The ring end surface (16) is axially offset relative to the roller end surface (32) in the direction (S1).

19 Claims, 3 Drawing Sheets

HOMOKINETIC JOINT

TECHNICAL FIELD

The present invention relates to homokinetic joints and, in particular, to homokinetic tripod joints for motor vehicle driveline systems.

BACKGROUND OF THE INVENTION

Homokinetic tripod joints typically include a female element with pairs of tracks, a male element having three arms, and a roller assembly on each arm and adapted to engage a pair of tracks in the female element. Roller assemblies can vary. One roller assembly configuration includes an inner ring, an outer roller surrounding the inner ring, and a ring of needle bearings between the inner ring and outer roller. Mechanisms vary for retaining the needle bearing ring and the roller assembly with respect to the arms of the male element.

One example of a homokinetic tripod joint is disclosed in Verbrugge, U.S. Pat. No. 6,416,231. This assembly comprises two washers or "circlips" which axially retain the needle bearing ring and the outer roller on the inner rings. Each washer is received in a groove which is arranged in the outer roller and is pressed on an end surface of the inner ring. The outer roller projects axially beyond the inner ring, at each side, in order to be able to receive the washers. This projection results in a relatively large spatial requirement for a given nominal load of the assembly. Consequently, the socket also takes up a relatively large amount of space.

Accordingly, there exists a need for an improved homokinetic joint having reduced size or bulk for a given nominal load capacity, while maintaining structural integrity and service life.

SUMMARY OF THE INVENTION

An object of the present invention is to overcome the disadvantages mentioned and to provide a roller assembly for homokinetic joints which has a small spatial requirement for a given nominal load and service life.

To this end, the present invention provides a homokinetic joint including a female element which delimits at least one pair of tracks facing each other, a male element having a center axis (X-X) and at least one arm, and a roller assembly. The roller assembly includes an inner ring having a first ring end surface which is directed in a first direction (S1) away from the center axis (X-X); an outer roller which surrounds the inner ring and which has a first roller end surface which is directed in the first direction (S1); a needle bearing ring which is arranged between the inner ring and the outer roller in order to allow the relative pivoting thereof about a common longitudinal axis (Z-Z), and an axial retaining mechanism for retaining at least the needle bearing ring on the inner ring. The retaining mechanism includes a first retaining surface which is connected to the inner ring and which radially overlaps the needles of the needle ring and which is directed in a second direction (S2) counter to the first direction, the first retaining surface being suitable for coming into contact with the needles of the needle ring. The first ring end surface is axially offset relative to the first roller end surface in the first direction, and the inner ring is mounted on the arm. The outer roller and the inner ring each have a second end surface which is directed in the second direction. The second end surface of the outer roller is offset relative to the second end surface of the inner ring in the second direction. Further, the axial retaining mechanism includes a second retaining surface which is connected to the outer roller. This retaining surface is arranged at the side of the needle ring opposite the first retaining surface and is suitable for coming into contact with the needle bearing ring.

In another embodiment, the homokinetic joint has a first retaining surface that radially overlaps the needle ring and at least partially the first end surface of the outer roller. The first retaining surface can also have a radial width which is less than the diameter of the needles. The first retaining surface may be formed by a collar which is fixedly joined to the inner ring. Further, the collar of the inner ring can have a radial width which is less than the diameter of the needles.

In another example, the retaining mechanism includes a stop surface which is fixedly joined to the inner ring and a first retaining washer which interposed between the needle ring and the stop surface. The first retaining washer can extend between the first ring end surface and the first roller end surface. The stop surface can be formed by a groove which is arranged in the inner ring and which receives the first retaining washer. In one example, the stop surface is formed by a collar of the inner ring which delimits the roller surface of the needles of the inner ring.

In a still further example of the present homokinetic joint, the second end surface of the inner ring is arranged substantially co-planar relative to the second retaining surface. The second retaining surface can have a radial width which is less than the diameter of the needles, and the second retaining surface can be integral with the outer roller. In other examples, the second retaining surface is formed by a second retaining ring which co-operates with a second stop surface provided, or the outer roller. The second step surface can be formed by a groove which is arranged in the outer roller and which receives the second retaining ring. The second stop surface can also be formed by a collar of the outer roller which delimits the needle roller surface of this roller. In such cases, the first retaining surface can be substantially co-planar relative to the first end surface of the outer roller.

In yet another embodiment, the inner ring includes a radially inner chamfered portion which is connected to the second end surface of the inner ring. The inner ring can also include an inner cylindrical contact surface.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

While the present invention is described with respect to an apparatus for use in a vehicle driveline, the invention may be adapted and utilized for other system which require constant velocity transmission joints. Also, in the following description, various operating parameters and components are described for several embodiments. These specific components are includes as examples and are not meant to be limiting.

Figure 1:
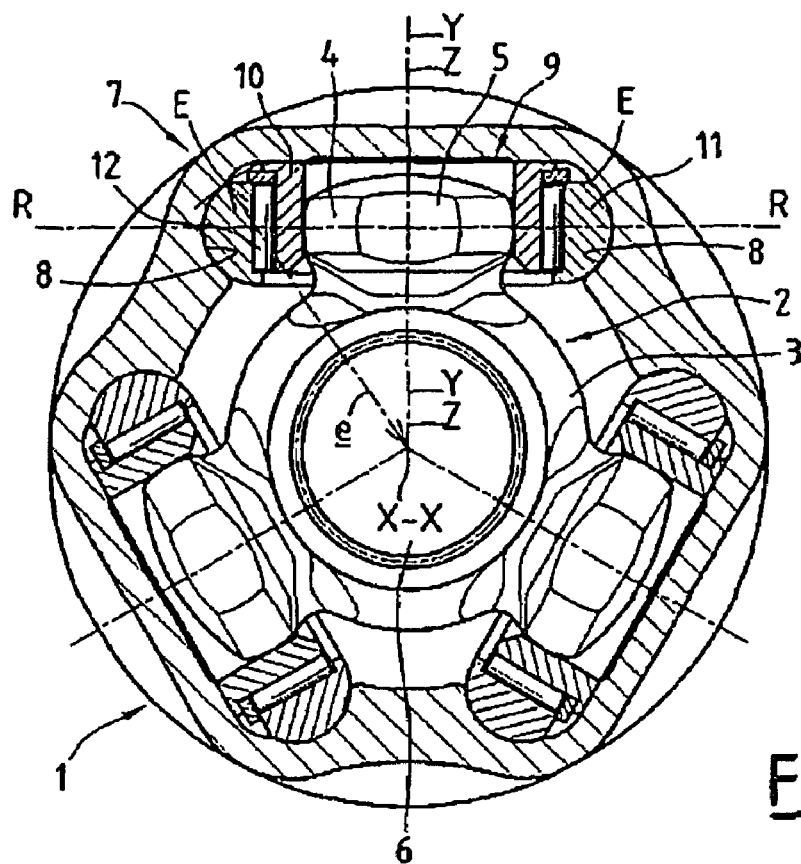
FIG. 1 is a cross-section of a transmission joint according to one embodiment of the present invention, in an aligned position.
Figure 2:
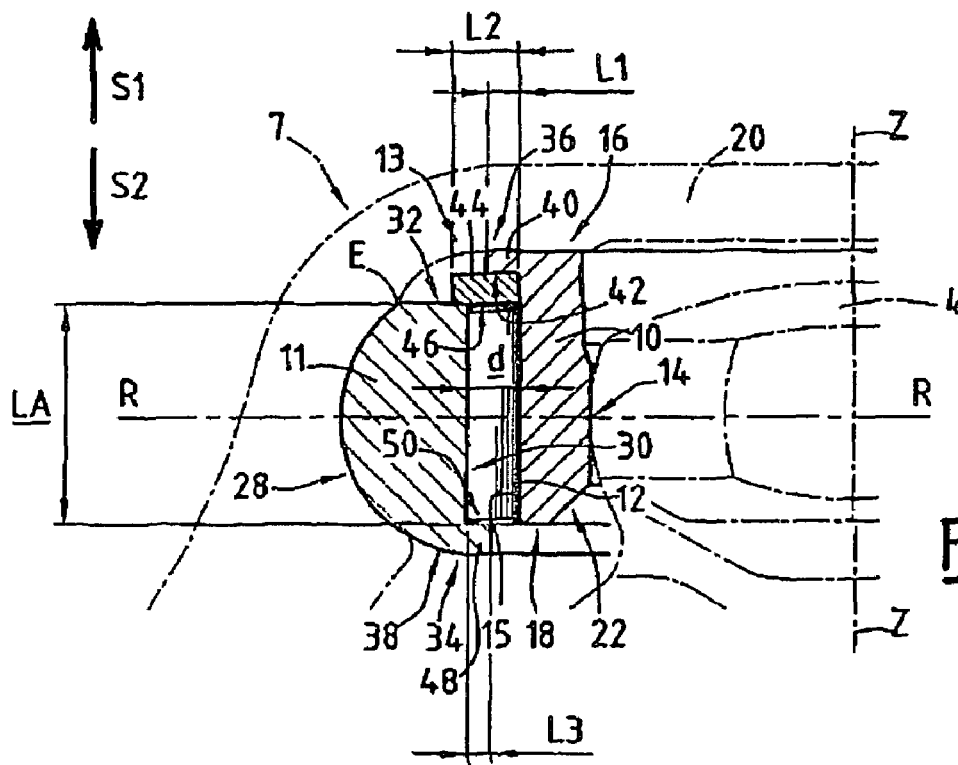
FIG. 2 is a partial sectioned view of a roller assembly for the joint of FIG. 1, drawn to an enlarged scale.

Referring now to the drawings wherein like reference numerals are used to identify the same components in the various views, the homokinetic joint 1 illustrated in FIGS. 1 and 2 substantially comprises a male element or tripod 2 having radial arms 4, a female element or socket 7 and, for each arm 4, a roller assembly 9.

The tripod 2 includes a hub 3 having a center axis X-X at which three radial arms 4 protrude which are angularly spaced at 120°. The end portion of each arm 4 forms an integral spherical bearing 5 which is centered on the axis Y-Y of the corresponding arm. This male element 2 is fixedly joined to a first rotation shaft 6.

The female element or socket 7 has a center axis which, when the joint is in the illustrated aligned position, coincides with the axis X-X. At one side and the other of each arm 4, the socket 7 has two roller tracks 8 facing each other. This female element 7 is fixedly joined to a second rotation shaft which is not illustrated.

Each arm 4 includes a roller assembly 9 having an axis Z-Z. This axis Z-Z coincides with the axis Y-Y of the corresponding arm 4 in the aligned position illustrated in FIG. 1. Since the three roller assemblies 9 are identical, only one will be described below.

In the following description, in which the joint is assumed to be aligned, the terms radial, axial, longitudinal and transverse should be understood in relation to the assembly 9 described, and therefore the axis Z-Z thereof.

As illustrated in more detail in FIG. 2, the roller assembly 9 includes: an inner ring 10 which is generally in the form of a hollow cylinder having an axis Z-Z; an outer roller 11 which is generally of a form generated by rotation having an axis Z-Z and surrounding the inner ring 10 with spacing; a ring of needle bearings referred to as a needle ring 12 which is arranged between the inner ring 10 and the outer roller 11; and an axial retention mechanism 13 for retaining the outer roller 11 and the needle ring 12 relative to the inner ring 10.

As illustrated in FIG. 2, the needles in the needle ring 12 have a diameter d and an axial length LA.

The inner ring 10 includes an inner cylindrical contact surface 14 which is pressed in a sliding and pivoting manner on the bearing 5 of the arm 4 of the tripod 2, and an outer cylindrical roller surface 15 on which the needle ring 12 travels. The ring 10 comprises a first planar frontal surface 16 and second planar frontal surface 18 which extend perpendicularly relative to the axis Z-Z. The first end surface 16 is directed in a first direction S1 which is directed radially outwards relative to the axis X-X of the hub 3, whilst the second end surface 18 is directed in a second direction S2 which is directed radially inwards relative to the axis X-X. The first end surface 16 is pressed against an arch 20 of the socket 7 when the joint is operational.

The axial end of the inner ring 10 which is associated with the second end surface 18 comprises a chamfered inner portion 22 which is connected radially to the end surface 18 and the contact surface 14. This portion 22 widens in the direction S2. The portion 22 allows substantial rotation of the assembly 9 about an axis R-R which extends perpendicularly relative to the axis Z-Z and therefore results in the joint having a large operating range.

The outer roller 11 includes an outer roller surface 28 in the form of a partial torus and a cylindrical inner roller surface 30 whose axial length is substantially identical to the length LA and on which the needle ring 12 travels. The roller 11 further includes a first end surface 32 which is directed in the same direction S1 as the first end surface 16, and a second end surface 34 which is directed in the opposite direction S2. The surface 32 extends perpendicularly relative to the axis Z-Z and extends from the surface 28 to the surface 30. The roller 11 defines two envelope points E which are defined by the intersection of the surfaces 28 and 32 and a central plane of the assembly 9, such as the plane of FIG. 2. These points E are located at a radius e from the axis X-X which defines the envelope of the assemblies 9 when the joint rotates (see FIG. 1). These points E are therefore decisive in terms of the spatial requirement of the joint.

The axial retention mechanism 13 includes, on the one hand, a first device 36 for retaining the needles of the ring 12 counter to a displacement in the first direction S1, and, on the other hand, a second device 38 for retaining the needles 12 counter to a displacement in the second direction S2.

The first retaining device 36, in this example, is an annular collar 40 which is provided on the axial end of the ring 10 and which forms a planar stop surface 42 which is directed in the second direction S2. The collar 40 radially protrudes at the cylindrical surface 15 of the ring 10 on which the needles travel. The collar 40 has a radial width L1 which is less than the diameter d of the needles 12 but which is greater than half the diameter d of the needles. Consequently, the collar 40 takes up a relatively small amount of space, whilst allowing effective retention.

The first retaining device 36 further includes a retaining washer 44 which is pressed against the stop surface 42 and which forms a surface 46 for retaining the needles, which surface is directed in the second direction S2. When the joint is operational, the needles come into contact with this surface 46. The retaining washer 44 is advantageously closed. The radial width L2 of the washer 44 is greater than the diameter d of the needles, with the result that the surface 46 also comes into contact with the surface 32 and forms a surface for retaining the outer roller 11. The retaining surface 46 is therefore substantially co-planar relative to the end surface 32 of the roller 11.

The first end surface 16 of the inner ring 10 is thus offset in the direction S1 relative to the first end surface 32 of the outer roller 11, and the washer 44 extends between these two surfaces 16, 32. Consequently, the radius e between the axis X-X of the hub 3 and the point E of the roller 11 furthest away from the axis X-X is relatively small for given external dimensions of the joint. The outer diameter of the socket 7 can therefore also be small.

The second retaining device 38 for retaining the needle ring 12 is formed by an annular collar 48 which protrudes radially inwards on the roller surface 30 of the outer roller 11 and which forms a retaining surface 50 which is directed in the first direction S1. The radial width L3 of the collar 48 is less than half the diameter d of the needles. Consequently, the assembly 9 has a large degree of mobility on the arm about the axis R-R. When the joint is operational, the needles of the ring 12 come into contact with the surface 50.

Owing to the presence of the collar 48, the second end surface 34 of the outer roller 11 is offset relative to the second end surface 18 of the inner ring 10 in the second direction S2, whilst the second end surface 18 is substantially co-planar relative to the retaining surface 50. Consequently, the assembly 9 has a large degree of mobility on the arm 4 about the axis R-R.

It should be noted that, in the absence of the socket 7, the outer roller 11, the needle ring 12 and the washer 44 can move in the direction S2 relative to the inner ring 10.

Figure 3:
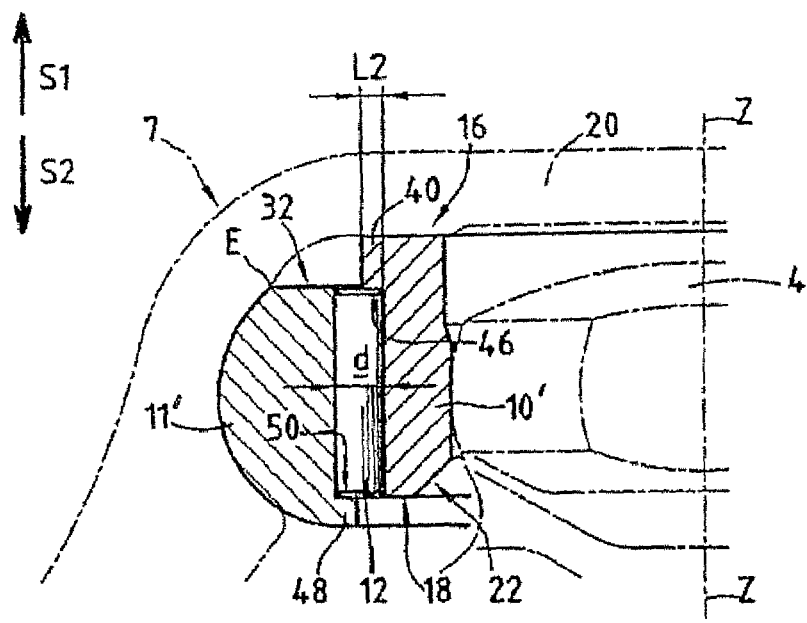
FIGS. 3 to 5 are views similar to FIG. 2, illustrating the first to third variants of the assembly according to the present invention.

FIG. 3 illustrates a first variant of the joint of FIGS. 1 and 2. The detailed view of FIG. 3 largely corresponds to that of FIG. 2. Only the differences relating to the joint of FIGS. 1 and 2 will be described below. Similar elements are indicated with the same reference numerals.

In FIG. 3, the inner ring 10' includes a collar 40 which is formed integrally with the inner ring 10' and which forms the needle retaining surface 46 for retaining the needles of the needle ring 12. The washer 44 has been omitted.

The needle retaining surface 46 has a radial width L2 which is less than the diameter d of the needles, and, consequently, the first end surface 32 does not come into contact with the needle retaining surface 46.

The retention of the outer roller 11' counter to a movement in the direction S1 is carried cut by means of the collar 48 and the needles 12.

Figure 4:
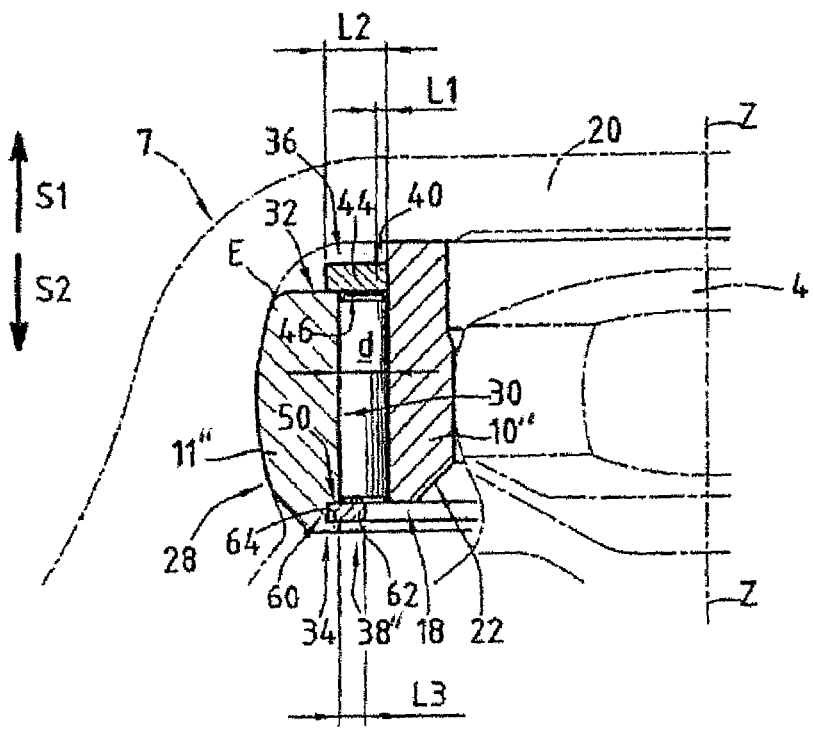

FIG. 4 illustrates a second variant of the joint according to an embodiment of the invention. This joint differs from the joint of FIGS. 1 and 2 in the following manner.

The outer roller surface 28 of the outer roller 11" is in the form of a partial sphere.

The second retaining device 38" for retaining the needles counter to a movement in the direction S2 includes a groove 60 which is arranged in the roller 11" and a split ring 62 which is snap-fitted in this groove 60. When the ring 62 is in the snap-fitted state, it radially protrudes at the inner roller surface 30 having a radial width L3 which is less than the diameter d of the needles. The ring 62 thus forms the surface 50 for retaining the needles, whilst the groove 60 forms a stop surface 64 which is directed in the first direction SI for the ring 62.

Figure 5:
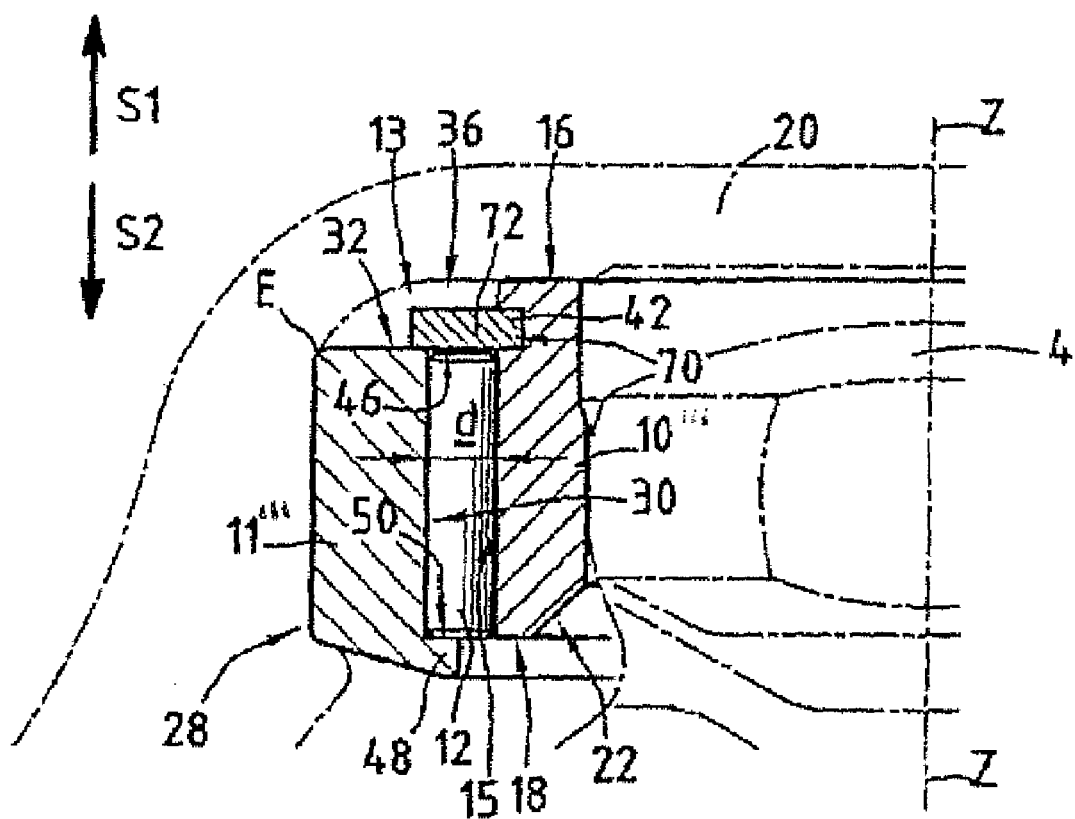

FIG. 5 illustrates a third variant of the joint according to an embodiment of the invention.

FIG. 5 shows, In contrast to the joint of FIGS. 1 and 2, that the outer roller 11''' includes a cylindrical outer roller surface 28. The first retaining device 36 includes a groove 70 which is arranged in the outer surface 15 of the inner ring 10''', as well as a split ring 72 which is snap-fitted in this groove 70. The retaining surface 46 is thus formed by this ring 72.

The split rings 62 and 72 which are snap-fitted in the grooves 60 and 70 allow the assembly and the joint to be produced and assembled in a simple manner.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. A homokinetic joint, comprising
a female element which delimits at least one pair of tracks facing each other, a male element having a center axis (X-X) and at least one arm, and a roller assembly, each roller assembly comprising:
an inner ring having a first ring end surface directed in a first direction (S1) which is directed counter to the center axis (X-X);
an outer roller surrounding the inner ring and having a first roller end surface which is directed in the first direction (S1);
a needle ring comprising a plurality of needles arranged between the inner ring and the outer roller and enabling relative pivoting thereof about a common longitudinal axis (Z-Z); and
an axial retention mechanism for axially retaining at least the needle ring on the inner ring, the retaining mechanism comprising a first retaining surface connected to the inner ring and radially overlapping the needles of the needle ring and which is directed in a second direction (S2) counter to the first direction (S1), the first retaining surface being adapted to contact the needles of the needle ring,
wherein the first ring end surface is axially offset relative to the first roller end surface in the first direction (S1), the inner ring being mounted on the arm, and
wherein the outer roller and the inner ring each comprise a second end surface which is directed in the second direction (S2), and wherein the second end surface of the outer roller is offset relative to the second end surface of the inner ring in the second direction (S2), and
wherein the axial retention mechanism comprises a second retaining surface which is connected to the outer roller, the second retaining surface being arranged at the side of the needle ring opposite the first retaining surface and adapted to contact the needle ring.

2. A homokinetic joint according to claim 1, wherein the first retaining surface radially overlaps the needle ring and at least partially the first end surface of the outer roller.

3. A homokinetic joint according to claim 1, wherein the first retaining surface has a radial width which is less than a diameter of the needles.

4. A homokinetic joint according to claim 1, wherein the first retaining surface is formed by a collar which is fixedly joined to the inner ring.

5. A homokinetic joint according to claim 4, wherein the collar of the inner ring has a radial width which is less than a diameter of the needles.

6. A homokinetic joint according to claim 1, wherein the second end surface of the inner ring is arranged substantially co-planar relative to the second retaining surface.

7. A homokinetic joint according to claim 1, wherein the second retaining surface is integral with the outer roller.

8. A homokinetic Joint according to claim 1, wherein the inner ring comprises a radially inner chamfered portion which is connected to the second end surface of the inner ring.

9. A homokinetic joint according to claim 1, wherein the inner ring comprises an inner cylindrical contact surface.

10. A homokinetic joint according to claim 1, wherein said male element comprises a tripod including three arms.

11. A homokinetic joint, comprising
a female element which delimits at least one pair of tracks facing each other, a male element having a center axis (X-X) and at least one arm, and a roller assembly, each roller assembly comprising:
an inner ring having a first ring end surface directed in a first direction (S1) which is directed counter to the center axis (X-X);
an outer roller surrounding the inner ring and having a first roller end surface which is directed in the first direction (S1);
a needle ring comprising a plurality of needles arranged between the inner ring and the outer roller and enabling relative pivoting thereof about a common longitudinal axis (Z-Z); and
an axial retention mechanism for axially retaining at least the needle ring on the inner ring, the retaining mechanism comprising a first retaining surface connected to the inner ring and radially overlapping the needles of the needle ring and which is directed in a second direction (S2) counter to the first direction (S1), the first retaining surface being adapted to contact the needles of the needle ring,
wherein the first ring end surface is axially offset relative to the first roller end surface in the first direction (S1), the inner ring being mounted on the arm, and wherein the outer roller and the inner ring each comprise a second end surface which is directed in the second direction (S2), and wherein the second end surface of the outer roller is offset relative to the second end surface of the inner ring in the second direction (S2), and wherein the axial retention mechanism comprises a second retaining surface which is connected to the outer roller, the second retaining surface being arranged at the side of the needle ring opposite the first retaining surface and adapted to contact the needle ring;

wherein the second retaining surface has a radial width which is less than a diameter of the needles.

12. A homokinetic joint, comprising
a female element which delimits at least one pair of tracks facing each other, a male element having a center axis (X-X) and at least one arm, and a roller assembly, each roller assembly comprising:

an inner ring having a first ring end surface directed in a first direction (S1) which is directed counter to the center axis (X-X);

an outer roller surrounding the inner ring and having a first roller end surface which is directed in the first direction (S1);

a needle ring comprising a plurality of needles arranged between the inner ring and the outer roller and enabling relative pivoting thereof about a common longitudinal axis (Z-Z); and an axial retention mechanism for axially retaining at least the needle ring on the inner ring, the retaining mechanism comprising a first retaining surface connected to the inner ring and radially overlapping the needles of the needle ring and which is directed in a second direction (S2) counter to the first direction (S1), the first retaining surface being adapted to contact the needles of the needle ring, wherein the first ring end surface is axially offset relative to the first roller end surface in the first direction (S1), the inner ring being mounted on the arm, and wherein the outer roller and the inner ring each comprise a second end surface which is directed in the second direction (S2), and wherein the second end surface of the outer roller is offset relative to the second end surface of the inner ring in the second direction (S2), and wherein the axial retention mechanism comprises a second retaining surface which is connected to the outer roller, the second retaining surface being arranged at the side of the needle ring opposite the first retaining surface and adapted to contact the needle ring;

wherein the axial retention mechanism comprises a stop surface which is fixedly joined to the inner ring and a first retaining washer which interposed between the needle ring and the stop surface.

13. A homokinetic joint according to claim 12, wherein the first retaining washer extends between the first ring end surface and the first roller end surface.

14. A homokinetic joint according to claim 12, wherein the stop surface is formed by a groove which is arranged in the inner ring and which receives the first retaining washer.

15. A homokinetic joint according to claim 12, wherein the stop surface is formed by a collar of the inner ring which delimits a roller surface of the needles of the inner ring.

16. A homokinetic joint, comprising
a female element which delimits at least one pair of tracks facing each other, a male element having a center axis (X-X) and at least one arm, and a roller assembly, each roller assembly comprising:

an inner ring having a first ring end surface directed in a first direction (S1) which is directed counter to the center axis (X-X);

an outer roller surrounding the inner ring and having a first roller end surface which is directed in the first direction (S1);

a needle ring comprising a plurality of needles arranged between the inner ring and the outer roller and enabling relative pivoting thereof about a common longitudinal axis (Z-Z); and an axial retention mechanism for axially retaining at least the needle ring on the inner ring, the retaining mechanism comprising a first retaining surface connected to the inner ring and radially overlapping the needles of the needle ring and which is directed in a second direction (S2) counter to the first direction (S1), the first retaining surface being adapted to contact the needles of the needle ring, wherein the first ring end surface is axially offset relative to the first roller end surface in the first direction (S1) the inner ring being mounted on the arm, and wherein the outer roller and the inner ring each comprise a second end surface which is directed in the second direction (S2), and wherein the second end surface of the outer roller is offset relative to the second end surface of the inner ring in the second direction (S2), and wherein the axial retention mechanism comprises a second retaining surface which is connected to the outer roller, the second retaining surface being arranged at the side of the needle ring opposite the first retaining surface and adapted to contact the needle ring;

wherein the second retaining surface is formed by a second retaining ring which cooperates with a second stop surface provided on the outer roller.

17. A homokinetic joint according to claim 16, wherein the second step surface is formed by a groove which is arranged in the outer roller and which receives the second retaining ring.

18. A homokinetic joint according to claim 16, wherein the second stop surface is formed by a collar of the outer roller which delimits a needle roller surface of the outer roller.

19. A homokinetic joint according to claim 18, wherein the first retaining surface is substantially co-planar relative to the first end surface of the outer roller.

* * * * *